(12) United States Patent  (10) Patent No.: US 11,741,967 B2
Ren et al.  (45) Date of Patent: Aug. 29, 2023

(54) SYSTEMS AND METHODS FOR AUTOMATIC SPEECH RECOGNITION BASED ON GRAPHICS PROCESSING UNITS

(71) Applicant: KWAI INC., Palo Alto, CA (US)

(72) Inventors: Yongxiong Ren, San Jose, CA (US); Heng Liu, Tucson, AZ (US); Yang Liu, San Jose, CA (US); Lingzhi Liu, San Jose, CA (US); Jie Li, Beijing (CN); Yuanyuan Zhao, Beijing (CN); Xiaorui Wang, Beijing (CN)

(73) Assignee: KWAI INC., Palo Alto, CA (US)

( * ) Notice: Subject to any disclaimer, the term of this patent is extended or adjusted under 35 U.S.C. 154(b) by 237 days.

(21) Appl. No.: 17/141,179

(22) Filed: Jan. 4, 2021

(65) Prior Publication Data

US 2022/0215843 A1  Jul. 7, 2022

(51) Int. Cl.
*G10L 15/00* (2013.01)
*G10L 15/28* (2013.01)
*G06T 1/20* (2006.01)
*G10L 19/00* (2013.01)

(52) U.S. Cl.
CPC ............... *G10L 15/28* (2013.01); *G06T 1/20* (2013.01); *G10L 19/00* (2013.01)

(58) Field of Classification Search
CPC ......... G10L 15/28; G10L 19/00; G10L 15/22; G06T 1/20
See application file for complete search history.

(56) References Cited

U.S. PATENT DOCUMENTS

| 10,719,764 | B2 | 7/2020 | Shazeer et al. | |
| 2017/0236518 | A1* | 8/2017 | Lane | G10L 15/14 |
| | | | | 704/240 |
| 2018/0253818 | A1* | 9/2018 | John | G06N 20/00 |
| 2020/0035222 | A1* | 1/2020 | Sypniewski | G06N 3/08 |

OTHER PUBLICATIONS

J. Kim and W. Sung, "Multi-user real-time speech recognition with a GPU," 2012 IEEE International Conference on Acoustics, Speech and Signal Processing (ICASSP), 2012, pp. 1617-1620, doi: 10.1109/ICASSP.2012.6288204. (Year: 2012).*

(Continued)

*Primary Examiner* — Bhavesh M Mehta
*Assistant Examiner* — Uthej Kunamneni
(74) *Attorney, Agent, or Firm* — Arch & Lake LLP

(57) ABSTRACT

An automatic speech recognition system and a method thereof are provided. The system includes an encoder and a decoder. The encoder comprises a plurality of encoder layers. At least one encoder layer includes a plurality of encoder sublayers fused into one or more encoder kernels. The system further comprises a first pair of ping-pong buffers communicating with the one or more encoder kernels. The decoder comprises a plurality of decoder layers. At least one decoder layer includes a plurality of decoder sublayers fused into one or more decoder kernels. The decoder receives a decoder output related to the encoder output and generates a decoder output. The encoder sends the decoder output to a beam search kernel.

22 Claims, 10 Drawing Sheets

(56) References Cited

OTHER PUBLICATIONS

I. Kim et al., "Development of highly accurate real-time large scale speech recognition system," 2015 IEEE International Conference on Consumer Electronics (ICCE), 2015, pp. 493-496, doi: 10.1109/ICCE.2015.7066496. (Year: 2015).*
Vaswani, Ashish et al., "Attention Is All You Need" Computation and Language (cs.CL); Machine Learning (cs.LG), arXiv: 1706.03762, https://doi.org/10.48550/arXiv. 1706.03762, (15p).
Zhao, Yuanyuan, et al. "The Speechtransformer For Large-Scale Mandarin Chinese Speech Recognition", IEEE Xplore, Nov. 4, 2020, (5p).
Nvidia DeepLearningExamples, (22p).

* cited by examiner an encoder receives one or more audio sequences and generates an encoder output
1301 a decoder receives the encoder output, generates a decoder output, and sends the decoder output to a beam search kernel
1302

SYSTEMS AND METHODS FOR AUTOMATIC SPEECH RECOGNITION BASED ON GRAPHICS PROCESSING UNITS

FIELD

The present application generally relates to automatic speech recognition, and in particular but not limited to, systems and methods for automatic speech recognition based on graphic processing units.

BACKGROUND

Automatic speech recognition (ASR) which allows the derivation of the transcription (word sequence) of an utterance given the speech waveform, has found its importance in many service applications, such as voice transcription, audio search, content review, and live streaming. One of important ASR approaches is to use an attention-mechanism based transformer model, namely speech transformer, which predicts word sequence by capturing long-term dependencies and wide-range context information. It can outperform the previously de facto ASR choice, i.e., recurrent neural networks that can model the temporal dependencies in the audio sequence effectively.

While the speech transformer has achieved excellent word/character error rate performance for both English and Chinese ASR, it requires significant amount of power and computation resources to process every audio corpus. An important goal in real deployments is to efficiently accelerate speech transformer on hardware devices, e.g., graphic processing units (GPUs).

SUMMARY

This disclosure describes examples of techniques relating to optimizing and accelerating speech transformer for CPU/GPU heterogenous platform.

According to a first aspect of the present disclosure, there is provided an ASR system. The ASR system includes an encoder including a plurality of encoder layers sequentially executed by one or more GPUs. At least one encoder layer includes a plurality of encoder sublayers that are fused into one or more encoder kernels. The encoder receives one or more audio sequences and generates an encoder output;

The ASR system further includes a first pair of ping-pong buffers. The one or more encoder kernels respectively read from one of the first pair of ping-pong buffers and write into the other of the first pair of ping-pong buffers.

The ASR system further includes a decoder that receives a decoder input based on the encoder output and generates a decoder output. The decoder includes a plurality of decoder layers sequentially executed by one or more GPUs. At least one decoder layer includes a plurality of decoder sublayers fused into one or more decoder kernels.

According to a second aspect of the present disclosure, there is provided an ASR method. The ASR method includes that an encoder receives one or more audio sequences and generates an encoder output. The encoder includes a plurality of encoder layers sequentially executed by one or more GPUs. At least one encoder layer includes a plurality of encoder sublayers that are fused into one or more encoder kernels. The one or more encoder kernels respectively read from one of a first pair of ping-pong buffers and write into the other of the first pair of ping-pong buffers.

The method further incudes that a decoder receives a decoder input based on the encoder output and generates a decoder output. The decoder includes a plurality of decoder layers sequentially executed by one or more GPUs. At least one decoder layer includes a plurality of decoder sublayers fused into one or more decoder kernels.

The method further includes that a beam search kernel receives the decoder output from the decoder, the beam search kernel performs a beam search operation to generate a plurality of candidate symbols, and the beam search kernel sends the plurality of candidate symbols to a decoder embedding kernel of the decoder. A number of the plurality of the candidate symbols is a pre-determined beam width.

According to a third aspect of present disclosure, there is provided a non-transitory computer readable storage medium comprising instructions stored therein. Upon execution of the instructions by one or more processors, the instructions cause the one or more processors to perform acts comprising: receiving, by an encoder, one or more audio sequences and generating an encoder output. The encoder comprises a plurality of encoder layers sequentially executed by the one or more processors. At least one encoder layer comprises a plurality of encoder sublayers fused into one or more encoder kernels. The one or more encoder kernels respectively read from one of a first pair of ping-pong buffers and write into the other of the first pair of ping-pong buffers.

Further, the instructions cause the one or more processors to perform acts comprising: receiving, by a decoder, a decoder input based on the encoder output and generating a decoder output. The decoder comprises a plurality of decoder layers sequentially executed by the one or more processors. At least one decoder layer comprises a plurality of decoder sublayers fused into one or more decoder kernels.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
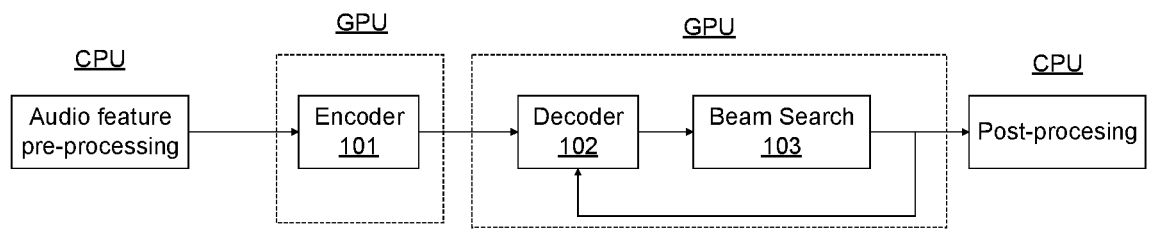
FIG. 1 is a block diagram illustrating a speech transformer in accordance with some embodiments of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a block diagram illustrating an exemplary speech transformer in accordance with some embodiments of the present disclosure. As shown in FIG. 1, audio data is pre-stored in a sever, a terminal, or storages in clouds. The server or the terminal may include an audio collector that collects the audio data. The audio collector may be a device independent from the server or the terminal and may communicate with the server or the terminal. The terminal may be, but not limited to, a computer, a laptop, a tablet, or a smart phone.

As shown in FIG. 1, the terminal then processes the audio data collected from the audio collector. For example, the terminal may extract a plurality of audio feature sequences from the audio data. Such processing of the audio data may be implemented on CPUs for serial multi-thread computation. Each of the plurality of audio feature sequences may include a plurality of frames. For example, the number of frames in an audio feature sequence may be 5, 10, 15, or more.

After the pre-processing of the audio data, following computation is parallelly performed on one or more GPUs. In some embodiments, GPU optimization is performed by dividing or packaging an encoder 101, a decoder 102, and/or a beam search 103 into different mega operators, fusing or integrating low-level operators into a single kernel to reduce memory access and runtime in kernel launch, and implementing half-precision fp16 operators (conventionally, full precision fp32 is used) to utilize high computation power of the fp16 device core. Accordingly, such GPU optimization may achieve significant acceleration of more than 10 times, more than 5 times, and more than 4 times in throughput (number of audio frames per second) at batch sizes of 1, 16, and 32, respectively, while maintaining the same word/character error rate (not sacrificing accuracy).

As shown in FIG. 1, after the audio data is processed by the encoder 101 and the decoder 102 implemented on the one or more GPUs, post-processing of the audio data is allocated on at least one CPU for serial multi-thread computation. In some examples, the encoder 101 and the decoder 102 may be implemented on the same group of GPUs. In other example, the encoder 101 and the decoder 102 may be implemented on different GPUs.

Figure 2:
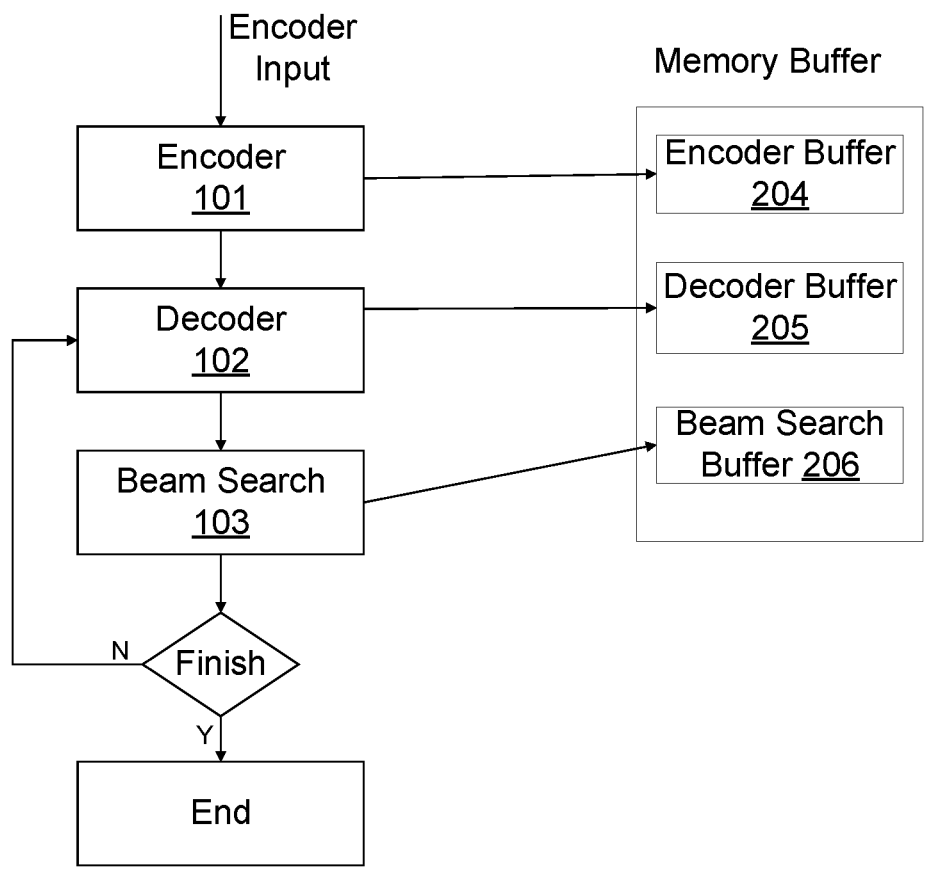
FIG. 2 is a flowchart illustrating a processing of audio data in an encoder-decoder structure in accordance with some embodiments of the present disclosure.

FIG. 2 a flowchart illustrating an exemplary processing of audio data in an encoder-decoder structure in accordance with some embodiments of the present disclosure.

The encoder 101 receives an encoder input that have been pre-processed on the at least one CPU. For example, the encoder input may include one or more audio feature sequences. In some embodiments, the one or more audio feature sequences may have a same length. The one or more audio feature sequences may be within a batch of a batch size. The batch size may be from 4 to 128 when deploying online. For example, the batch size may be 4, 16, 32, and 64.

In some embodiments, one audio feature sequence may be indicated by an input sequence of symbols $x=(x_1, \ldots, x_n)$. The encoder 101 may parallelly map all the audio feature sequences to a plurality of sequences of representations. A sequence of representation may be presented by $y=(y_1, \ldots, y_n)$ and n may be an integer. Given y, the decoder

102 then generates an output sequence of symbols $z=(z_1, \ldots, z_n)$ at each time step of a plurality of time steps.

In some embodiments, the encoder may include a plurality of encoder layers sequentially executed on one or more GPUs. The encoder 101s may communicate with an encoder buffer 204. The plurality of encoder layers may include a first encoder layer, one or more intermediate encoder layers, and a last encoder layer. The one or more audio feature sequences are parallelly sent or fed to a first encoder layer. After the first encoder layer receives all the one or more audio feature sequences, a first encoder layer output is generated and sent to one of the one or more intermediate encoder layers. An intermediate encoder layer receives the first encoder layer output, generates an intermediate encoder layer output and sends to a following intermediate encoder layer. As such, each intermediate encoder layer receives an output from a previous encoder layer and then sends a generated output to a following intermediate encoder layer. The last intermediate encoder layer sends its output to the last encoder layer and the last encoder layer generates an encoder output and sends the encoder output to the decoder 102.

In some embodiments, as illustrated in FIG. 2, the decoder 102 may communicate with a decoder buffer 205. The decoder buffer 205 may be a memory cache that allows parallel computation of multiple beams during decoding. For example, the decoder 102 may read from or write to the memory cache.

Figure 3:
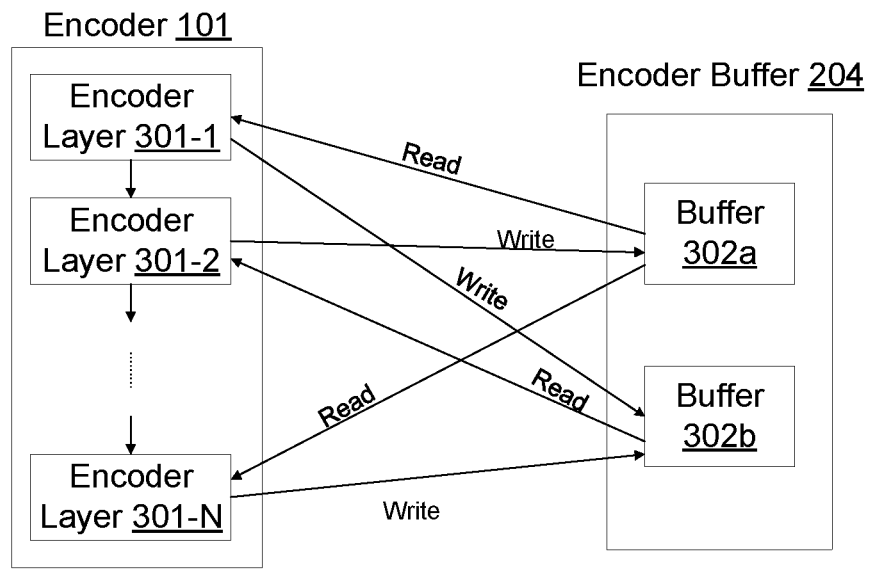
FIG. 3 shows a pair of ping-pong buffers communicating with an encoder in accordance with some embodiments of the present disclosure.

The encoder 101 may include a plurality of stacked encoder layers. For example, the plurality of stacked encoder layers may include encoder layer 301-1, encoder layer 301-2, ..., encoder layer 301-N, as shown in FIG. 3. N may be a positive integer. Each encoder layer 301-i may include a plurality of encoder sublayers, where i may be an integer between 1 and N, including 1 and N. Some encoder sublayers may be fused into one single encoder kernel. When many of these encoder sublayers are fused into one kernel, computation cost and memory access cost are accordingly reduced. Each encoder layer 301-i may be implemented by one or more encoder kernels. The one or more encoder kernels may be implemented by one or more compute unified device architecture (CUDA) kernels that can be directly run on GPUs.

In some embodiments, the one or more audio sequences are parallelly sent to the first encoder layer 301-1, where the encoder layer 301-1 generates a first output and sends the first output to the next encoder layer 301-2. As such, each of the following encoder layers respectively receives an output from a previous encoder layer, generates its own output and sends its own output to the next encoder layer. The last encoder layer 301-N then generates the encoder output and sends the encoder output to the decoder 102.

The decoder 102 may include a plurality of stacked decoder layers. For example, the plurality of stacked decoder layers may include decoder layer 401-1, decoder layer 401-2, ..., decoder layer 401-M, where M may be a positive integer. Each decoder layer 401-j may include a plurality of decoder sublayers, where j may be an integer between 1 and M, including 1 and M. Some decoder sublayers may be fused into one single decoder kernel. When many of these decoder sublayers are fused into one kernel, computation cost and memory access cost are accordingly reduced. Each decoder layer 401-j may be implemented by one or more decoder kernels. The one or more kernels of the decoder may be implemented by one or more compute unified device architecture (CUDA) kernels that can be directly run on GPUs.

The decoder 102, at each time step of a plurality of time steps, generates a decoder output to a beam search 103, as shown in FIG. 2. The decoder output may include an output sequence of symbols. The beam search 103 performs a beam search operation and generates a plurality of candidate symbols. In some embodiments, the beam search operation selects multiple candidate words or characters for an output sequence sent from the decoder 102 at each time step based on conditional probability. The beam search 103 may communicate with a beam search buffer 206. In some embodiments, the beam search buffer 206 may be a memory cache. The memory cache is used for storing previously calculated beam paths.

The number of the plurality of candidate symbols may be of a beam width B. In some embodiments, at each time step, the beam search kernel 203 selects B number of best candidate symbols with the highest probability as the most likely possible choices for the time step. The beam width B may be determined as 3, 5, or more.

In some embodiments, when decoding processing of all audio sequences within a batch of the batch size has not finished, the beam search 103 may send the plurality of candidate symbols that are generated at each time step to the decoder 102 as part of a decoder input of the decoder 102. And the decoder 102 and the beam search 103 may perform the decoding operation until all audio sequences in a batch of the batch size reaches an end-of-sentence (EOS) symbol. In some embodiments, outputs generated by the decoder 102 and the beam search 103 would be final results, i.e., texts.

FIG. 3 shows a pair of ping-pong buffers communicating with an encoder in accordance with some embodiments of the present disclosure. The encoder 101 may include a plurality of encoder layers 301-1, 301-2, ..., 301-N, where N is a positive integer. Each encoder layer may communicate with the encoder buffer 204. The encoder buffer 204 may have a ping-pong buffer structure, which allows processing of data of large batch sizes. For example, when an output of one encoder layer is written into one buffer of a pair of ping-pong buffers, the next encoder layer then reads from this buffer of the pair of ping-pong buffers.

As shown in FIG. 3, the encoder buffer 204 may include a pair of ping-pong buffers including buffer 302a and buffer 302b. The encoder layer 301-1 reads from the buffer 302a and writes to the buffer 302b. The encoder layer 301-2 reads from the buffer 302b and writes to the buffer 302a.

Figure 4:
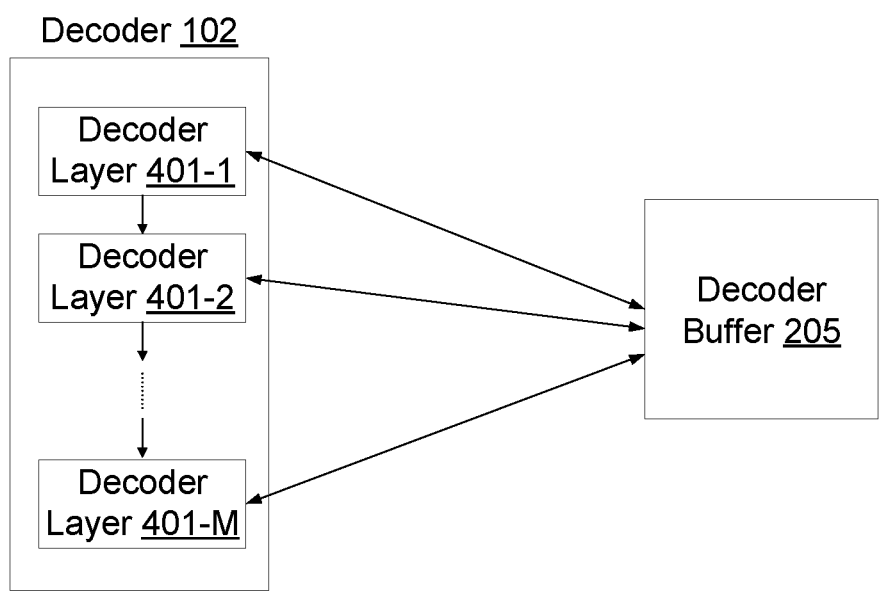
FIG. 4 shows a decoder buffer communicating with a decoder in accordance with some embodiments of the present disclosure.

FIG. 4 shows a decoder buffer communicating with a decoder in accordance with some embodiments of the present disclosure. The decoder 102 includes a plurality of decoder layers 401-1, 401-2, ..., 401-M, where M is a positive integer. Each decoder layer may communicate with a decoder buffer 205. The decoder buffer 205 may be a memory cache. As shown in FIG. 4, the decoder layers 401-1, 401-2, ..., and 401-M may parallelly read from and write to the decoder buffer 205. In some embodiments, the memory cache is used for storing previously calculated top B beam paths to avoid repeated calculation. Because for later steps, if the beam path that has been calculated shows up again, there is no need to recalculate it.

Figure 5:
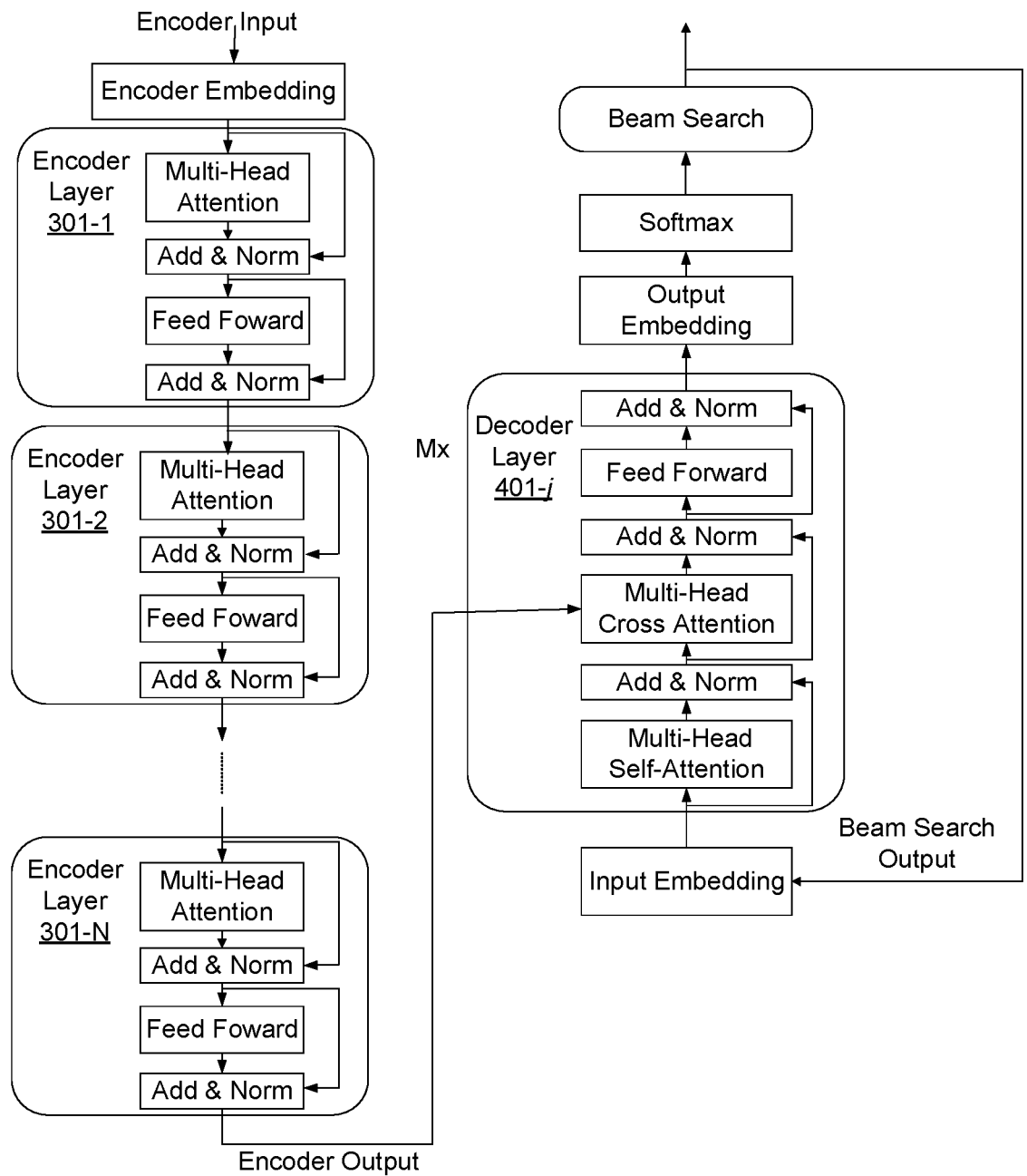
FIG. 5 shows an encoder-decoder structure in accordance with some embodiments of the present disclosure.

FIG. 5 shows an encoder-decoder structure in accordance with some embodiments of the present disclosure. The encoder 101 may include N encoder layers including encoder layer 301-1, encoder layer 301-2, ..., encoder layer 301-N. The encoder input is fed into a process of encoder embedding first. An output generated by the process of encoder embedding is then sent to the encoder layer 301-1. An output of the first encoder layer 301-1 is then sent to the encoder layer 301-2. As such, each of the following encoder layers 301-*i* receives an input from the previous encoder layer 301-(*i*−1) and sends respective output to the next encoder layer 301-(*i*+1), where i is an integer between 2 and N−1, including 2 and N−1. At last, the encoder layer 301-N sends its output to the decoder layers of decoder 102.

As shown in FIG. 5, each encoder layer may include processes of multi-head attention and feed forward. A residual connection together with layer norm are employed between each of the processes. In some embodiments, the process of encoder embedding may be implemented in the first encoder layer, that is, the encoder layer 301-1.

As shown in FIG. 5, the decoder processes the batch data in a step-by-step fashion. Each compute only output one symbol, that is, one word or character. For example, the first decoder layer 401-1 calculates at a first time step t, and the next decoder layer, the second decoder layer 401-2 then calculates at a second time step t+1, where t may indicate a time. For one time step, all the decoder sublayers will be calculated sequentially.

As shown in FIG. 5, the decoder layer output of the decoder layer 401-*j* is sent to processes of output embedding and softmax, and then sent to the process of beam search. An output generated by the process of beam search may then be sent to the process of input embedding of the decoder 102. The process of softmax applies a softmax function over inputs of a softmax layer to generate probability distribution over the possible network outputs at the current time step.

Figure 6:
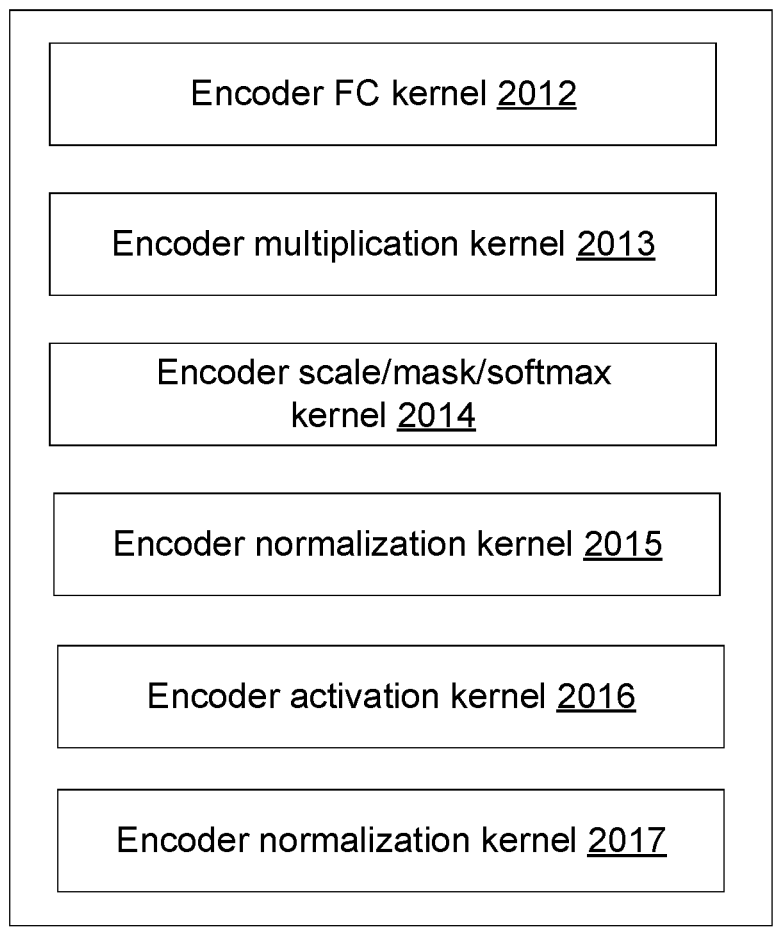
FIG. 6 shows an encoder layer including a plurality of encoder kernels in accordance with some embodiments of the present disclosure.

FIG. 6 shows an encoder layer including a plurality of kernels in accordance with some embodiments of the present disclosure. An encoder layer may be implemented by a plurality of encoder kernels. As shown in FIG. 6, the encoder layer 301-*i* may include an encoder FC kernel 2012, an encoder multiplication kernel 2013, an encoder scale/mask/softmax kernel 2014, an encoder normalization kernel 2015, an encoder activation kernel 2016, and an encoder normalization kernel 2017. The first encoder layer, that is, the encoder layer 301-1, may also include an encoder embedding kernel 2011. The plurality of encoder kernels of the encoder layer may read from the buffer 302*a* and write to buffer 302*b*.

The encoder embedding kernel 2011 may obtain an input embedding by mapping one audio feature sequence into an embedding vector based on a word embedding table, obtains a positional embedding corresponding to a position within the audio feature sequence, and generates an encoder embedding vector by adding the input embedding and the positional embedding.

Figure 7:
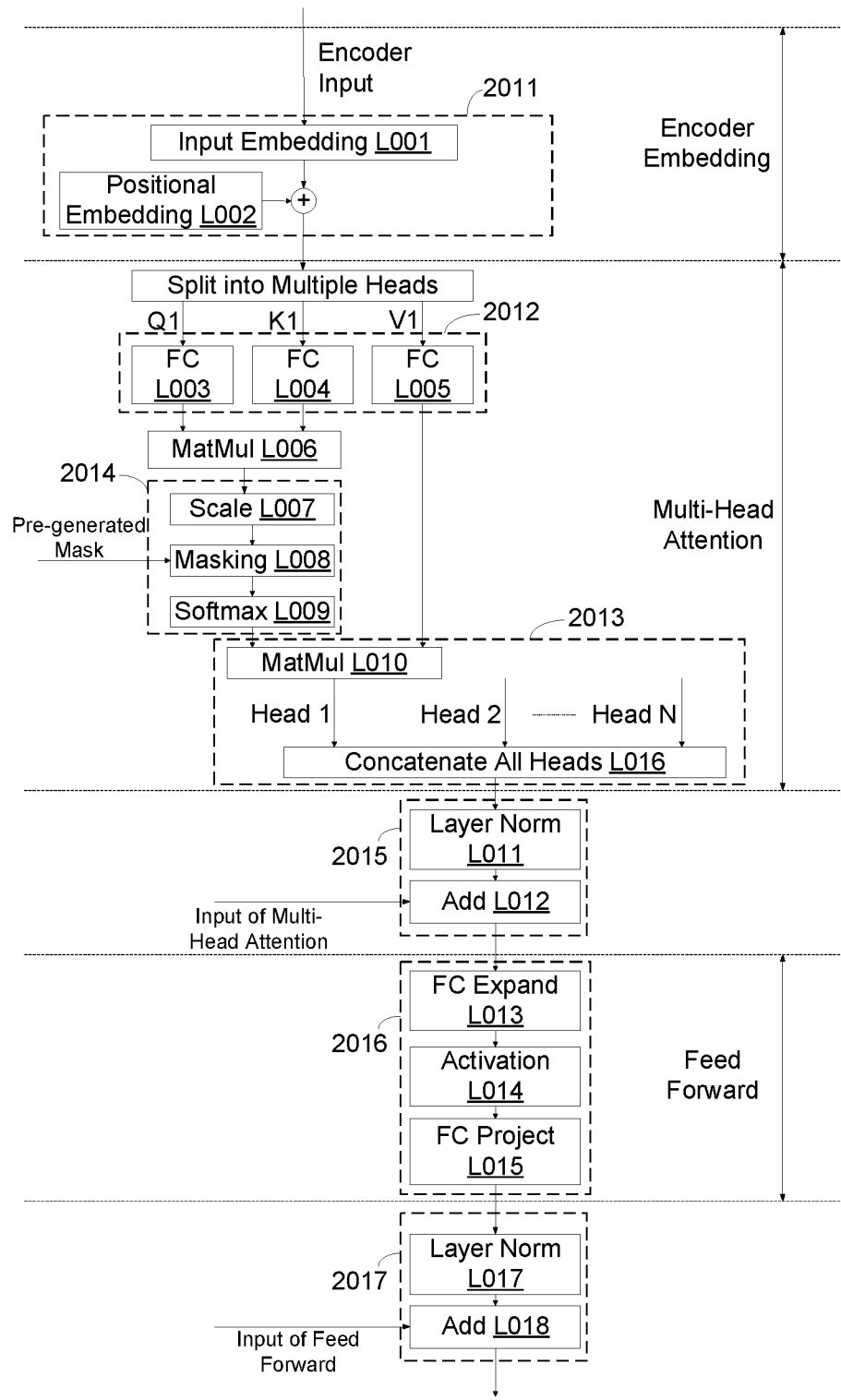
FIG. 7 shows an encoder layer including multiple encoder sublayers fused into multiple encoder kernels in accordance with some embodiments of the present disclosure.

In some embodiments, as shown in FIG. 7, during the process of encoder embedding, an input embedding sublayer L001 and a positional embedding sublayer L002 are fused into the encoder embedding kernel 2011. The input embedding sublayer L001 receives the encoder input, maps the encoder input into one or more embedding vectors, and generates one or more input embeddings. The mapping here may be based on a word embedding table. The positional embedding sublayer L002 generates one or more positional embeddings. Then, the one or more input embeddings and the one or more positional embeddings may be added and outputted by an additional FC sublayer.

In some embodiments, in the process of multi-head attention, an encoder layer may include multiple FC sublayers that are fused into a single FC kernel 2012, such that complexity of computation is significantly reduced. As shown in FIG. 7, a first encoder FC sublayer L003, a second encoder FC sublayer L004, and a third encoder FC sublayer L005 are fused into the encoder FC kernel 2012. Weight matrix of the three encoder FC sublayers are grouped into a big matrix, such that the computation is faster than computing three small matrix computation.

As shown in FIG. 7, the encoder FC kernel 2012 may load a pre-combined weight matrix based on a first query matrix Q1, a first key matrix K1, and a first value matrix V1. The first query matrix Q1 may be generated by packing a plurality of queries. The first key matrix K1 may be generated by packing a plurality of keys. The first value matrix V1 may be generated by packing a plurality of values. Here, the plurality of queries, keys, and values may be related to the encoder layers.

In some embodiments, the encoder FC kernel 2012 may do following: $y=w*x+b$, where x is an FC input, w is a weight matrix, b is the bias, and * is a multiplication operation.

In some embodiments, an encoder layer may include a matrix multiplication sublayer L006, a matrix multiplication sublayer L010, a concatenating sublayer L016. The matrix multiplication sublayer L006 may perform a batched matrix multiplication and may be fused into one single encoder kernel. The matrix multiplication sublayer L010 and the concatenating sublayer L016 may be fused into the encoder multiplication kernel 2013. The encoder multiplication kernel 2013 perform for a plurality of attention heads, such as Head 1, Head 2, . . . , and Head N, as shown in FIG. 7. The matrix multiplication sublayer L010 may perform a batched matrix multiplication.

In some embodiments, an encoder layer may include multiple sublayers including, as shown in FIG. 7, a scale sublayer L007, a masking sublayer L008, and a softmax sublayer L009. These sublayers are fused into the single encoder scale/mask/softmax kernel 2014. The masking sublayer L008 may perform a masking operation based on a pre-generated mask. The pre-generated mask may be determined based the length of the audio feature sequences.

In some embodiments, an encoder layer may include a layer norm sublayer L011 and an additional FC sublayer L012. The layer norm sublayer L011 and a bias of the additional FC sublayer L012 are fused into the encoder normalization kernel 2015, as shown in FIG. 7. In some embodiments, the additional FC sublayer L012 may do following: $y=w*x+b$, where x is an FC input, w is a weight matrix, b is a bias, and * is a multiplication operation. The bias of the additional FC sublayer and the layer norm sublayer are fused together into a single encoder kernel.

The layer norm sublayer L011 performs a normalization operation and the additional FC sublayer L012 performs an adding operation. That is, the encoder normalization kernel 2015 receives a multi-head attention output from the encoder multiplication kernel 2013, normalizes the multi-head attention output, generates a normalization output by adding the normalized multi-head attention output and an input of the process of the multi-head attention. The input of the process of the multi-head attention may be the output of the encoder embedding kernel 2011. The multi-head attention output may be generated by concatenating the plurality of attention heads.

In some embodiments, the encoder normalization kernel 2015 may implement all the residual connections together with the layer norm in the encoder 101. In some embodiments, each encoder layer of the encoder 101 may include all the sublayers shown in FIG. 7. In some embodiments, each encoder layer of the encoder 101 may be implemented by the plurality of kernels including all the encoder kernels shown in FIG. 6.

In some embodiments, the plurality of encoder sublayers of the encoder 101 may include an encoder FC expand sublayer L013, an encoder FC project sublayer L015, and an encoder activation sublayer L014. A bias unit of the encoder FC expand sublayer L013 and the encoder activation sublayer L014 are fused into the encoder activation kernel 2016 of the first encoder layer. A bias unit of the encoder FC project sublayer L015 and a subsequent sublayer are fused into a single encoder kernel. The subsequent sublayer may be a sublayer subsequently following the encoder FC project sublayer L015. The subsequent sublayer may be in the same encoder layer as the encoder FC project sublayer L015, and may also be in a different encoder layer subsequently following the encoder layer that the encoder FC project sublayer L015 is in.

In some embodiments, the encoder FC expand sublayer L013 has an expansion factor. The expansion factor may be 4. The encoder FC project sublayer L015 may linearly project an input of the FC project sublayer into lower dimension.

In some embodiments, as shown in FIG. 7, an encoder normalization kernel 2017 may be included after the process of feed forward. For example, a layer norm sublayer L017 and a bias of an additional FC sublayer L018 are fused into the encoder normalization kernel 2017, as shown in FIG. 7. In some embodiments, the additional FC sublayer L018 may do following: y=w*x+b, where x is an FC input, w is a weight matrix, b is a bias, and * is a multiplication operation. The bias of the additional FC sublayer and the layer norm sublayer are fused together into a single encoder kernel.

may be fused into the encoder normalization kernel 2017. The layer norm sublayer L017 may receive an output from the encoder activation kernel 2016, normalizes the received output, generates a normalization output by adding the normalized output and an input of the process of the feed forward. The input of the process of the feed forward is the output of the encoder normalization kernel 2015. In some embodiments, the encoder normalization kernel 2017 and the encoder normalization kernel 2015 may be implemented by a single encoder kernel.

Figure 8:
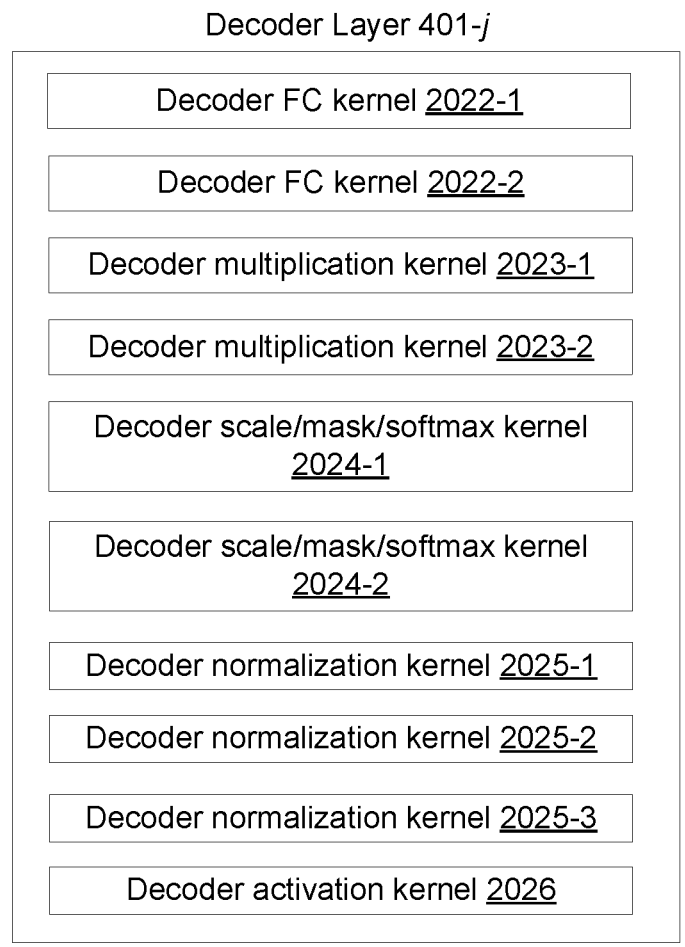
FIG. 8 shows a decoder layer including a plurality of decoder kernels in accordance with some embodiments of the present disclosure.

FIG. 8 shows a decoder layer including a plurality of kernels in accordance with some embodiments of the present disclosure. A decoder layer 401-j may be implemented by a plurality of kernels. As shown in FIG. 8, the plurality of kernels may include a decoder FC kernel 2022-1, a decoder FC kernel 2022-2, a decoder multiplication kernel 2023-1, a decoder multiplication kernel 2023-2, a decoder scale/mask/softmax kernel 2024-1, a decoder scale/mask/softmax kernel 2024-2, a decoder normalization kernel 2025-1, a decoder normalization kernel 2025-2, a decoder normalization kernel 2025-3, and a decoder activation kernel 2026. In some embodiments, each decoder layer of the decoder may be implemented by a plurality of kernels including all the kernels shown in FIG. 8.

Figure 9:
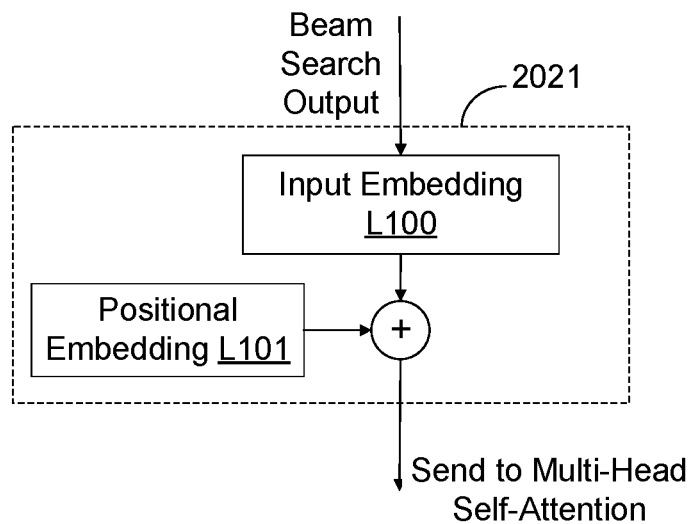
FIG. 9 shows a decoder embedding kernel in accordance with some embodiments of the present disclosure.

In some embodiments, as shown in FIG. 9, an embedding sublayer L100 and a positional embedding sublayer L101 may be fused into a decoder embedding kernel 2021 of the decoder 102. The embedding sublayer L101 may receive a beam search output generated by the beam search kernel at a previous time as an input, map the input into one or more embedding vectors, and generate one or more input embeddings. The mapping here may be based on a word embedding table. The positional embedding sublayer L101 may generate one or more positional embeddings. Then, the one or more input embeddings and the one or more positional embeddings may be added and outputted by an additional FC sublayer.

Accordingly, the decoder embedding kernel 2021 may receive the input related to a beam search output at the previous time step. The decoder embedding kernel 2021 may then obtain the input embedding by mapping the input into the embedding vector based on the word embedding table, obtain the positional embedding corresponding to the position within the input embedding, and generates a decoder embedding vector by adding the input embedding and the positional embedding.

Figure 10:
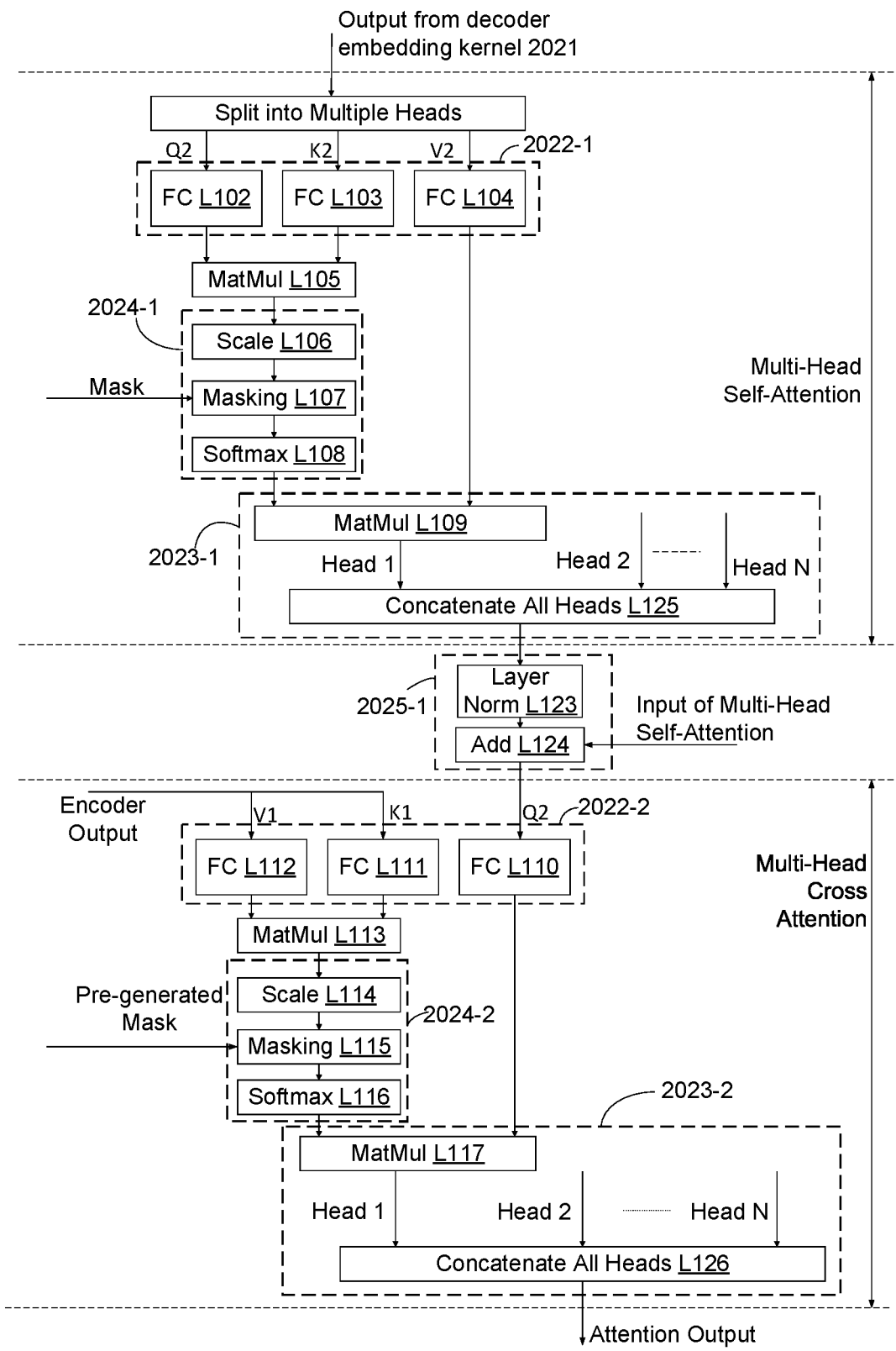
FIG. 10 shows a decoder layer including multiple decoder sublayers fused into multiple decoder kernels in accordance with some embodiments of the present disclosure.

As shown in FIG. 10, multiple FC sublayers may be fused into a single decoder FC kernel 2022-1, such that complexity of computation is significantly reduced. As shown in FIG. 10, a first decoder FC sublayer L102, a second decoder FC sublayer L103, and a third decoder FC sublayer L104 are fused into the decoder FC kernel 2022-1. Weight matrix of the three decoder FC sublayers are grouped into a big matrix, such that the computation is faster than computing three small matrix computation.

As shown in FIG. 10, in the multi-head self-attention process, the decoder FC kernel 2022-1 may load a pre-combined weight matrix based on a second query matrix Q2, a second key matrix K2, and a second value matrix V2. The second query matrix Q2 may be generated by packing a plurality of queries. The second key matrix K2 may be generated by packing a plurality of keys. The second value matrix V2 may be generated by packing a plurality of values. Here, the plurality of queries, keys, and values may be related to the decoder layers.

In some embodiments, the decoder FC kernel 2022-1 may do following: y=w*x+b, where x is an FC input, w is a weight matrix, b is a bias, and * is a multiplication operation.

In some embodiments, a decoder layer may include a matrix multiplication sublayer L105, a matrix multiplication sublayer L109, and a concatenating sublayer L125. The matrix multiplication sublayer L105 may be fused into one singe decoder kernel. The matrix multiplication sublayer L109 and the concatenating sublayer L125 may be fused into the decoder multiplication kernel 2023-1. The decoder multiplication kernel 2023-1 perform for a plurality of attention heads, such as Head 1, Head 2, . . . , and Head N, as shown in FIG. 10.

In some embodiments, multiple sublayers may be fused into the decoder normalization kernel 2025-1. As shown in FIG. 10, a layer norm sublayer L123 and a bias of an additional FC sublayer L124 are fused into the decoder normalization kernel 2025-1. In some embodiments, the additional FC sublayer L124 may do following: y=w*x+b, where x is an FC input, w is a weight matrix, b is a bias, and * is a multiplication operation. The bias of the additional FC sublayer and the layer norm sublayer are fused together into a single encoder kernel.

The layer norm sublayer L123 performs a normalization operation and the additional FC sublayer L124 performs an adding operation. That is, the decoder normalization kernel 2025-1 may receive a multi-head self-attention output, normalize the multi-head self-attention output, generate a normalization output by adding the normalized multi-head self-attention output and an input of the process of the multi-head self-attention. The multi-head self-attention output may be generated by concatenating the plurality of attention heads by the decoder multiplication kernel 2023-1. The input of the process of the multi-head self-attention is the output generated by the decoder embedding kernel 2021.

In some embodiments, multiple sublayers may be fused into the decoder scale/mask/softmax kernel 2024-1. As shown in FIG. 10, in the process of multi-head self-attention, a scale sublayer L106, a masking sublayer L107, and a softmax sublayer L108 are fused into the single decoder scale/mask/softmax kernel 2024-1. The masking sublayer L107 may perform a masking operation based on a mask. The mask here ensures that the self-attention is performed only on previous frames that have been received by the decoder 102, and not performed on future frames that have not been received. That is, the mask ensures that the self-attention only applies to frames or data that are at positions preceding the current output position in the decoder output sequence.

As shown in FIG. 10, multiple FC sublayers may be fused into a single decoder FC kernel 2022-2, such that complexity of computation is significantly reduced. As shown in FIG. 10, a decoder FC sublayer L112, a decoder FC sublayer L111, and a decoder FC sublayer L110 are fused into the decoder FC kernel 2022-2. Weight matrix of the three decoder FC sublayers are grouped into a big matrix, such that the computation is faster than computing three small matrix computation.

During the process of multi-head cross attention, the decoder FC kernel 2022-2 may load a pre-combined matrix based on the second query matrix Q2, the first key matrix K1, and the first value matrix V1. The second query matrix Q2 may be generated by packing a plurality of queries. The first key matrix K1 may be generated by packing a plurality of keys. The first value matrix V1 may be generated by packing a plurality of values. Here, the plurality of keys and values are related to the encoder layers, and the plurality of queries are related to the decoder layers. And a matrix multiplication sublayer L113 fused in a decoder multiplication kernel may perform batched matrix multiplication operation for the plurality of attention heads.

In some embodiments, the decoder FC kernel 2022-2 may do following: $y=w*x+b$, where x is an FC input, w is a weight matrix, b is a bias, and * is a multiplication operation.

As shown in FIG. 10, in the process of multi-head cross attention, a scale sublayer L114, a masking sublayer L115, and a softmax sublayer L116 are fused into the single decoder scale/mask/softmax kernel 2024-2. The masking layer may perform a masking operation based on a pre-generated mask. The pre-generated mask may be determined based a length of the audio feature sequences. In the process of multi-head cross attention, a multi-head attention output may be generated by concatenating the plurality of attention heads and sent to the decoder normalization kernel 2025-2.

In some embodiments, a decoder layer may include a matrix multiplication sublayer L117 and a concatenating sublayer L126. The matrix multiplication sublayer L117 and the concatenating sublayer L126 may be fused into the decoder multiplication kernel 2023-2. The decoder multiplication kernel 2023-2 perform for a plurality of attention heads, such as Head 1, Head 2, . . . , and Head N, as shown in FIG. 10.

Figure 11:
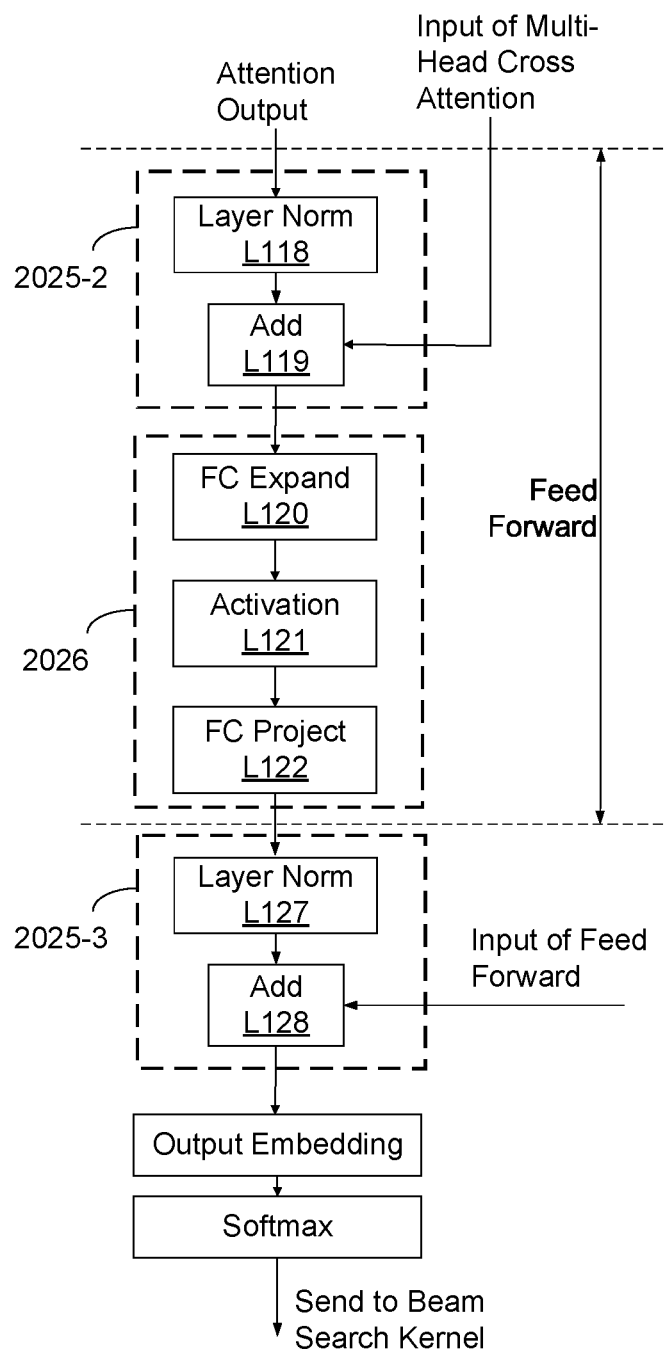
FIG. 11 shows a decoder layer including multiple decoder sublayers in accordance with some embodiments of the present disclosure.

In some embodiments, multiple sublayers may be fused into the decoder normalization kernel 2025-2. As shown in FIG. 11, a layer norm sublayer L118 and a bias of an additional FC sublayer L119 are fused into the decoder normalization kernel 2025-2. In some embodiments, the additional FC sublayer L119 may do following: $y=w*x+b$, where x is an FC input, w is a weight matrix, b is a bias, and * is a multiplication operation. The bias of the additional FC sublayer and the layer norm sublayer are fused together into a single encoder kernel.

The layer norm sublayer L118 performs a normalization operation and the additional FC sublayer L119 performs an adding operation. That is, the decoder normalization kernel 2025-2 may receive the multi-head attention output, normalize the multi-head attention output, generate a normalization output by adding the normalized multi-head attention output and the multi-head attention output received. The multi-head attention output may be generated by concatenating the plurality of attention heads by the decoder multiplication kernel 2023-2.

In some embodiments, the decoder normalization kernel 2025-1 and the decoder normalization kernel 2025-2 are implemented by a single decoder kernel.

In some embodiments, multiple sublayers may be fused into the decoder activation kernel 2026. As shown in FIG. 11, the plurality of decoder sublayers of the decoder 102 may include a decoder FC expand sublayer L120, a decoder FC project sublayer L122, and a decoder activation sublayer L121. A bias unit of the decoder FC expand sublayer L120 and the activation layer L121 are fused into the decoder activation kernel 2026. A bias unit of the decoder FC project sublayer L122 and a subsequent sublayer are fused into a single decoder kernel. The subsequent sublayer may be in the same encoder layer as the decoder FC project sublayer L122, and may also be in an encoder layer subsequently following the encoder layer which the decoder FC project sublayer L122 is in.

In some embodiments, the FC expand sublayer L120 may have an expansion factor. The expansion factor may be 4. The FC project sublayer L122 may linearly project an input of the FC project sublayer into lower dimension.

In some embodiments, multiple sublayers may be fused into the decoder normalization kernel 2025-3. As shown in FIG. 11, a layer norm sublayer L127 and a bias of an additional FC sublayer L128 are fused into the decoder normalization kernel 2025-3. In some embodiments, the additional FC sublayer L128 may do following: $y=w*x+b$, where x is an FC input, w is a weight matrix, b is a bias, and * is a multiplication operation. The bias of the additional FC sublayer and the layer norm sublayer are fused together into a single encoder kernel.

The layer norm sublayer L127 performs a normalization operation and the additional FC sublayer L128 performs an adding operation. That is, the decoder normalization kernel 2025-3 may receive an output generated by the decoder activation kernel 2026, normalize the output, generate a normalization output by adding the normalized output and an input of the process of feed forward. The input of the process of feed forward may be the attention output generated by the decoder multiplication kernel 2023-2.

In some embodiments, the decoder normalization kernel 2025-1, the decoder normalization kernel 2025-2, and the decoder normalization kernel 2025-3 are implemented by a single decoder kernel. In some embodiments, the encoder normalization kernel 2015, the encoder normalization kernel 2017, the decoder normalization kernel 2025-1, the decoder normalization kernel 2025-2, and the decoder normalization kernel 2025-3 are all implemented by a single kernel.

Figures 12, 13:
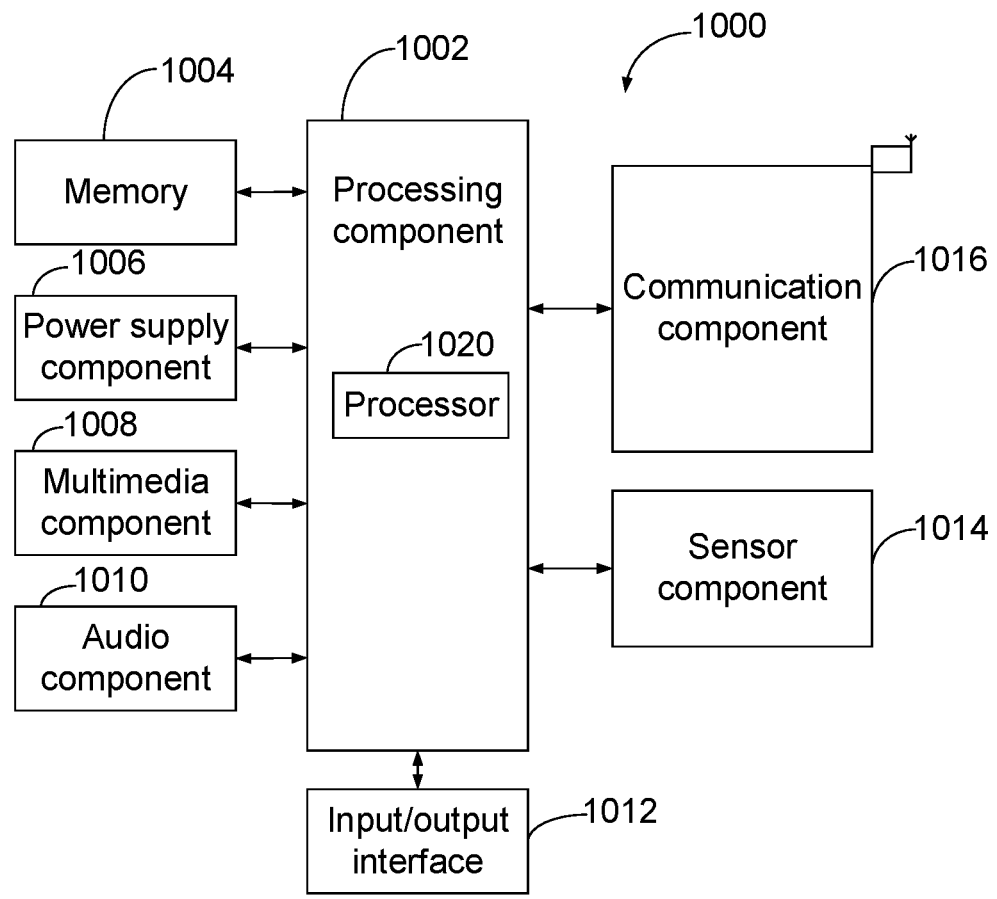
FIG. 12 is a block diagram illustrating an automatic speech recognition system in accordance with some embodiments of the present disclosure.
FIG. 13 is a flowchart illustrating an exemplary automatic speech recognition method in accordance with some embodiments of the present disclosure.

FIG. 12 is a block diagram illustrating an automatic speech recognition system in accordance with some implementations of the present disclosure. The system 1000 may be a terminal, such as a mobile phone, a tablet computer, a digital broadcast terminal, a tablet device, or a personal digital assistant.

As shown in FIG. 12, the system 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the system 1000, such as operations relating to display, a telephone call, data communication, a camera operation and a recording operation. The processing component 1002 may include one or more processors 1020 for executing instructions to complete all or a part of steps of the above method. The processors 1020 may include CPU, GPU, DSP, or other processors. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the system 1000. Examples of such data include instructions, contact data, phonebook data, messages, pictures, videos, and so on for any application or method that operates on the system 1000. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the system 1000. The power supply component 1006 may include a power supply management system, one or more power supplies, and other components associated with generating, managing and distributing power for the system 1000.

The multimedia component 1008 includes a screen providing an output interface between the system 1000 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the system 1000 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC). When the system 1000 is in an operating mode, such as a call mode, a recording mode and a voice recognition mode, the microphone is configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button and a lock button.

The sensor component 1014 includes one or more sensors for providing a state assessment in different aspects for the system 1000. For example, the sensor component 1014 may detect an on/off state of the system 1000 and relative locations of components. For example, the components are a display and a keypad of the system 1000. The sensor component 1014 may also detect a position change of the system 1000 or a component of the system 1000, presence or absence of a contact of a user on the system 1000, an orientation or acceleration/deceleration of the system 1000, and a temperature change of system 1000. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the system 1000 and other devices. The system 1000 may access a wireless network based on a communication standard, such as WiFi, 4G, or a combination thereof. In an example, the communication component 1016 receives a broadcast signal or broadcast related information from an external broadcast management system via a broadcast channel. In an example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the system 1000 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

FIG. 13 is a flowchart illustrating an exemplary automatic speech recognition in accordance with some embodiments of the present disclosure.

In step 1301, an encoder receives one or more audio sequences and generates an encoder output.

In some embodiments, the encoder may include a plurality of encoder layers that are sequentially executed by one or more GPUs.

In step 1302, a decoder receives the encoder output, generates a decoder output, and sends the decoder output to a beam search kernel.

In some embodiments, the decoder may include a plurality of decoder layers that are sequentially executed by one or more GPUs.

In some embodiments, each encoder layer may include a plurality of sublayers. Some sublayers of the plurality of sublayers of each encoder layer may be fused into one or more encoder kernels. The one or more encoder kernels of each encoder layer may respectively read from one of a first pair of ping-pong buffers and write into the other of the first pair of ping-pong buffers.

Figure 14:
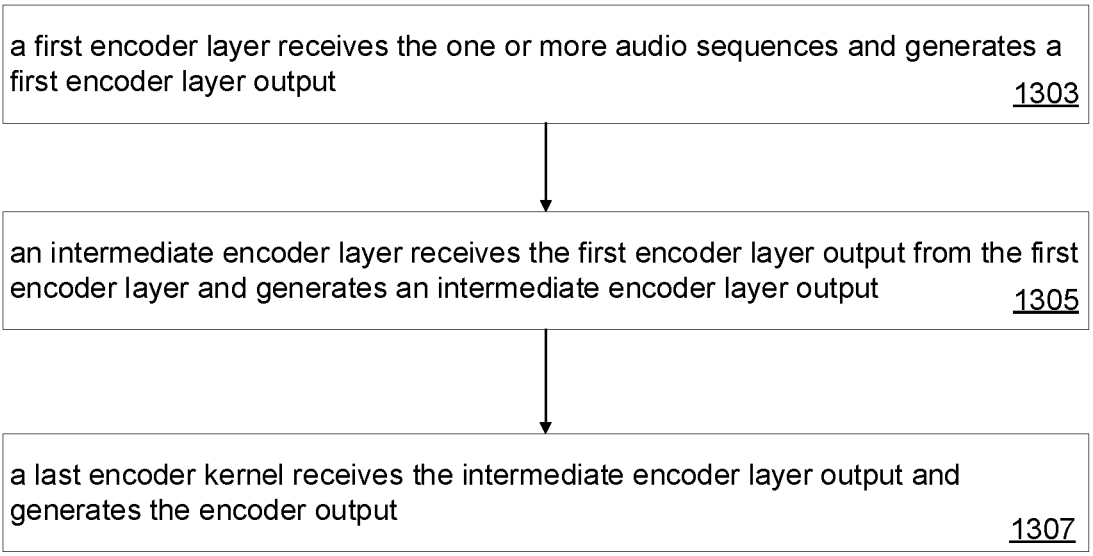
FIG. 14 is a flowchart illustrating an exemplary automatic speech recognition method in accordance with some embodiments of the present disclosure.

FIG. 14 is a flowchart illustrating an exemplary automatic speech recognition method in accordance with some embodiments of the present disclosure. FIG. 14 shows detailed steps performed in an encoder.

In step 1303, a first encoder layer of the plurality of encoder layers receives the one or more audio sequences and generates a first encoder layer output.

In step 1305, an intermediate encoder layer receives the first encoder layer output from the first encoder layer and generates an intermediate encoder layer output.

In some embodiments, there may be multiple intermediate encoder layers. Each intermediate encoder layer receives an output from the previous encoder layer and then sends a generated output to the next encoder layer. The last intermediate encoder layer sends its output to the last encoder layer and the last encoder layer generates an encoder output and sends the encoder output to the decoder.

In step 1307, a last encoder kernel receives the intermediate encoder layer output and generates the encoder output.

Figure 15:
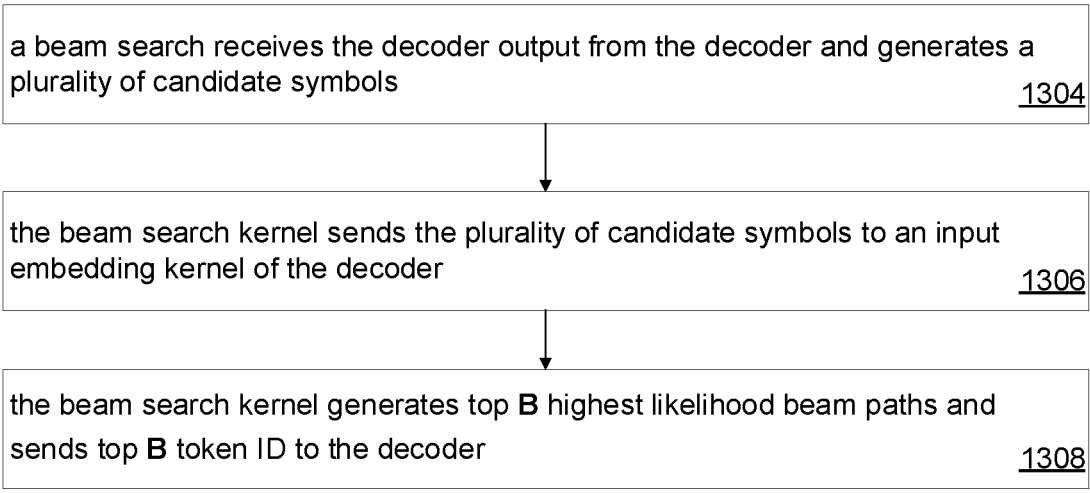
FIG. 15 is a flowchart illustrating an exemplary automatic speech recognition method in accordance with some embodiments of the present disclosure.

FIG. 15 is a flowchart illustrating an exemplary automatic speech recognition method in accordance with some embodiments of the present disclosure. FIG. 15 shows detailed steps performed in a decoder and a beam search kernel.

In step 1304, a beam search receives the decoder output from the decoder and generates a plurality of candidate symbols.

In some embodiments, the number of the plurality of the candidate symbols is a pre-determined beam width. The beam width may be 3, 5, or more.

In step 1306, the beam search kernel sends the plurality of candidate symbols to an input embedding kernel of the decoder.

In some embodiments, the beam search kernel performs a beam search operation and generates a plurality of candidate symbols. For example, the beam search operation selects multiple candidate words or characters as an output.

In some embodiments, when decoding processing of all audio sequences within a batch of the batch size has not finished, the beam search kernel may send the plurality of candidate symbols that are generated at each time step to the decoder as part of a decoder input of the decoder 102. The decoder and the beam search kernel may perform the decoding operation until all audio sequences in a batch of the batch size reaches an EOS symbol.

In step 1308, the beam search kernel generates top B highest likelihood beam paths and sends top B token ID to the decoder.

In some embodiments, when the EOS symbol is reached or the entire batch sequence data is decoded, the highest likelihood beam path for the whole sequence may be a final ASR output. The token ID may be converted into texts using a token-character dictionary. B is the beam width.

In some embodiments, there is provided a non-transitory computer readable storage medium 1004, having instructions stored therein. When the instructions are executed by one or more processors 1020, the instructions cause the processor to perform methods as illustrated in FIGS. 13-15.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. An automatic speech recognition system, comprising:
    an encoder comprising a plurality of encoder layers sequentially executed by one or more graphic processing units (GPUs), wherein at least one encoder layer comprises a plurality of encoder sublayers fused into one or more encoder kernels, wherein the encoder receives one or more audio sequences and generates an encoder output;
    a first pair of ping-pong buffers, wherein the one or more encoder kernels connect and respectively read from one of the first pair of ping-pong buffers and write into the other of the first pair of ping-pong buffers; and
    a decoder that receives a decoder input based on the encoder output and generates a decoder output comprising an output sequence, wherein the decoder comprises a plurality of decoder layers sequentially executed by one or more GPUs, wherein at least one decoder layer comprises a plurality of decoder sublayers fused into one or more decoder kernels.

2. The system of claim 1, wherein the plurality of encoder layers comprise a first encoder layer, an intermediate encoder layer, and a last encoder layer, wherein the first encoder layer receives the one or more audio sequences and generates a first encoder layer output, the intermediate encoder layer receives the first encoder layer output from the first encoder layer and generates an intermediate encoder layer output, and the last encoder layer receives the intermediate encoder layer output and generates the encoder output; and
    wherein the decoder receives the decoder input at a current time step of a plurality of time steps, and the decoder input is based on the encoder output and a decoder output generated by the decoder at a time step prior to the current time step.

3. The system of claim 2, wherein the plurality of encoder layers further comprise one or more intermediate encoder layers, and the one or more intermediate encoder layers respectively receives an output generated from a previous intermediate encoder layer.

4. The system of claim 1, further comprising:
    a decoder memory cache, wherein the one or more decoder kernels parallelly communicate with the decoder memory cache.

5. The system of claim 1, wherein the plurality of encoder sublayers comprise a first encoder fully connected (FC) sublayer, a second encoder FC sublayer, and a third encoder FC sublayer, wherein the first encoder FC sublayer, the second encoder FC sublayer, and the third encoder FC sublayer are fused into an encoder FC kernel; and
    wherein the plurality of decoder sublayers comprise a first decoder FC sublayer, a second decoder FC sublayer, and a third decoder FC sublayer, wherein the first decoder FC sublayer, the second decoder FC sublayer, and the third decoder FC sublayer are fused into a decoder FC kernel.

6. The system of claim 5, wherein the plurality of encoder sublayers comprise an encoder input embedding sublayer and an encoder positional embedding sublayer, wherein the encoder input embedding sublayer and the encoder positional embedding sublayer are fused into an encoder embedding kernel; and wherein the encoder embedding kernel obtains an input embedding by mapping the one or more audio sequences into an embedding vector based on a word embedding table, obtains a positional embedding corresponding to a position within the one or more audio sequences, and generates an encoder embedding vector by summing the input embedding and the positional embedding.

7. The system of claim 6, wherein the encoder FC kernel loads a pre-combined weight matrix based on a first query matrix, a first key matrix, and a first value matrix, wherein the first query matrix is generated by packing a plurality of queries, the first key matrix is generated by packing a plurality of keys, the first value matrix is generated by packing a plurality of values, the plurality of queries, keys, and values are related to the plurality of encoder layers; and
wherein the plurality of sublayers further comprise an encoder matrix multiplication sublayer and an encoder concatenating sublayer, wherein the encoder matrix multiplication sublayer and the encoder concatenating sublayer are fused into an encoder multiplication kernel, and the encoder multiplication kernel generates an encoder multiplication output for a plurality of attention heads.

8. The system of claim 1, wherein the plurality of sublayers comprise a scale sublayer, a masking sublayer, and a softmax sublayer, wherein the scale sublayer, the masking sublayer, and the softmax sublayer are fused into a single encoder kernel, and the masking sublayer performs a masking operation based on a pre-generated mask that is determined based a length of the audio sequence.

9. The system of claim 7, wherein the plurality of encoder sublayers further comprise an encoder layer norm sublayer and an encoder additional FC sublayer, the encoder additional FC sublayer comprises a bias, wherein the encoder layer norm sublayer and the bias are fused into an encoder normalization kernel, and wherein the encoder layer norm sublayer receives a first sublayer input and generated a normalized first sublayer input, the encoder additional FC sublayer adds the normalized first sublayer input and the encoder embedding vector generated by the encoder embedding kernel.

10. The system of claim 1, wherein the plurality of encoder sublayers comprises a fourth encoder fully connected (FC) sublayer, an encoder activation sublayer, and a fifth encoder FC sublayer, the fourth encoder FC sublayer comprises a first bias, the fifth encoder FC sublayer comprises a second bias, the encoder activation sublayer and the first bias are fused into an encoder activation kernel, and the second bias and a subsequent sublayer are fused into a single encoder kernel, wherein the subsequent sublayer subsequently follows the fifth encoder FC sublayer.

11. The system of claim 6, wherein the one or more decoder kernels comprise a decoder embedding kernel, the decoder embedding kernel receives a beam search output from a beam search kernel and generates a decoder embedding vector based on the beam search output.

12. The system of claim 11, wherein the decoder FC kernel loads a pre-combined weight matrix based on a second query matrix, a second key matrix, and a second value matrix, wherein the second query matrix is generated by packing a plurality of queries, the second key matrix is generated by packing a plurality of keys, the second key matrix is generated by packing a plurality of values, and the plurality of queries, keys, and values are related to the plurality of decoder layers.

13. The system of claim 12, wherein the plurality of decoder sublayers comprise a decoder matrix multiplication sublayer and a decoder concatenating sublayer, wherein the decoder matrix multiplication sublayer and the decoder concatenating sublayer are fused into a decoder multiplication kernel, and the decoder multiplication kernel generates a decoder multiplication output by concatenating a plurality of attention heads.

14. The system of claim 1, wherein the plurality of decoder sublayers comprise a scale sublayer, a masking sublayer, and a softmax sublayer, wherein the scale sublayer, the masking sublayer, and the softmax sublayer are fused into a single decoder kernel, and the masking sublayer performs a masking operation based on an attention mask that applies only on a decoder layer input that the at least one decoder layer has received.

15. The system of claim 11, wherein the decoder FC kernel loads a pre-combined weight matrix based on a second query matrix, a first key matrix, and a first value matrix, wherein the second query matrix is generated by packing a plurality of queries, the first key matrix is generated by packing a plurality of keys, the first value matrix is generated by packing a plurality of values, the plurality of keys and values are related to the plurality of encoder layers, and the plurality of queries are related to the plurality of decoder layers.

16. The system of claim 13, wherein the plurality of decoder sublayers further comprise a decoder layer norm sublayer and a decoder additional FC sublayer, wherein the decoder additional FC sublayer comprises a bias, wherein the decoder layer norm sublayer and the bias are fused into an decoder normalization kernel, wherein the decoder layer norm sublayer receives a first sublayer input and generated a normalized first sublayer input, the decoder additional FC sublayer adds the normalized first sublayer input and the decoder embedding vector generated by the decoder embedding kernel; and
the plurality of decoder sublayers comprise a fourth decoder FC sublayer, a decoder activation sublayer, and a fifth decoder FC sublayer, the fourth decoder FC sublayer comprises a first bias and the fifth decoder FC sublayer comprise a second bias, the first bias and the decoder activation sublayer are fused into a decoder activation kernel, and the second bias and a subsequent sublayer are fused into a single decoder kernel, wherein the subsequent sublayer subsequently follows the fifth decoder FC sublayer.

17. An automatic speech recognition method, comprising:
receiving, by an encoder, one or more audio sequences and generating an encoder output, wherein the encoder comprises a plurality of encoder layers sequentially executed by one or more graphic processing units (GPUs), wherein at least one encoder layer comprises a plurality of encoder sublayers fused into one or more encoder kernels, wherein the one or more encoder kernels respectively read from one of a first pair of ping-pong buffers and write into the other of the first pair of ping-pong buffers; and
receiving, by a decoder, a decoder input based on the encoder output and generating a decoder output, wherein the decoder comprises a plurality of decoder layers sequentially executed by one or more GPUs, and wherein at least one decoder layer comprises a plurality of decoder sublayers fused into one or more decoder kernels.

18. The method of claim 17, wherein the plurality of encoder layers comprise a first encoder layer, an intermediate encoder layer, and a last encoder layer, wherein the first encoder layer receives the one or more audio sequences and generates a first encoder layer output, the intermediate encoder layer receives the first encoder layer output from the first encoder layer and generates an intermediate encoder layer output, the last encoder kernel receives the intermediate encoder layer output and generates the encoder output; and wherein the decoder receives the decoder input at a current time step of a plurality of time steps, and the decoder input is based on the encoder output and a decoder output generated by the decoder at a time step prior to the current time step.

19. The method of claim 18, wherein the plurality of encoder layers further comprise one or more intermediate encoder layers, and the one or more intermediate encoder layers respectively receives an output generated from a previous intermediate encoder layer; and wherein the one or more decoder kernels parallelly communicate with a decoder memory cache.

20. The method of claim 17, further comprising:

receiving, by a beam search kernel, the decoder output from the decoder;

performing, by the beam search kernel, a beam search operation to generate a plurality of candidate symbols, wherein a number of the plurality of the candidate symbols is a pre-determined beam width; and sending, by the beam search kernel, the plurality of candidate symbols to a decoder embedding kernel of the decoder.

21. A non-transitory computer readable storage medium, comprising instructions stored therein, wherein, upon execution of the instructions by one or more processors, the instructions cause the one or more processors to perform acts comprising:

receiving, by an encoder, one or more audio sequences and generating an encoder output, wherein the encoder comprises a plurality of encoder layers sequentially executed by the one or more processors, wherein at least one encoder layer comprises a plurality of encoder sublayers fused into one or more encoder kernels, wherein the one or more encoder kernels respectively read from one of a first pair of ping-pong buffers and write into the other of the first pair of ping-pong buffers; and receiving, by a decoder, a decoder input based on the encoder output and generating a decoder output, wherein the decoder comprises a plurality of decoder layers sequentially executed by the one or more processors, and wherein at least one decoder layer comprises a plurality of decoder sublayers fused into one or more decoder kernels.

22. The non-transitory computer readable storage medium of claim 21, the instructions cause the one or more processors to perform acts further comprising receiving, by a beam search kernel, the decoder output from the decoder;

performing, by the beam search kernel, a beam search operation to generate a plurality of candidate symbols, wherein a number of the plurality of the candidate symbols is a pre-determined beam width; and sending, by the beam search kernel, the plurality of candidate symbols to a decoder embedding kernel.

\* \* \* \* \*